United States Patent [19]

Simpkins

[11] 3,883,157
[45] May 13, 1975

[54] BICYCLE CONVERSION DEVICE

[76] Inventor: Kenneth Wayne Simpkins, 3024 N. 24th St., Phoenix, Ariz. 85016

[22] Filed: Sept. 24, 1973

[21] Appl. No.: 400,392

[52] U.S. Cl. ............................ 280/287; 403/92
[51] Int. Cl. ..................................... B62k 15/00
[58] Field of Search ........... 280/287; 83/454, 466.1, 83/761, 762; 403/92, 16; 285/283

[56] References Cited
UNITED STATES PATENTS

| | | | |
|---|---|---|---|
| 561,665 | 6/1896 | Hubbell | 280/287 X |
| 578,921 | 3/1897 | Guy | 280/287 X |
| 599,016 | 2/1898 | Ryan | 280/287 |
| 1,180,965 | 4/1916 | Baly | 403/92 |
| 1,381,033 | 6/1921 | Thornton | 83/762 |
| 2,359,764 | 10/1944 | Johnson | 280/287 X |
| 2,372,024 | 3/1945 | Schwinn | 280/287 |
| 2,389,811 | 11/1945 | Ozlek | 403/92 |
| 3,187,373 | 6/1965 | Fisher | 403/92 X |

*Primary Examiner*—Philip Goodman
*Assistant Examiner*—Terrance L. Siemens

[57] ABSTRACT

A device for converting a conventional two wheel bicycle into a conveniently portable compact folding bicycle by severing the frame into a front section and a rear section with hinge means provided on each of the sections for pivotally connecting the same together permitting the orientation of the frame between a conventional service position permitting the utilization of the bicycle, and an inoperative carrying, transporting, and storage position in which the two wheels of the bicycle are located substantially side-by-side in spaced and approximately parallel relationship.

3 Claims, 6 Drawing Figures

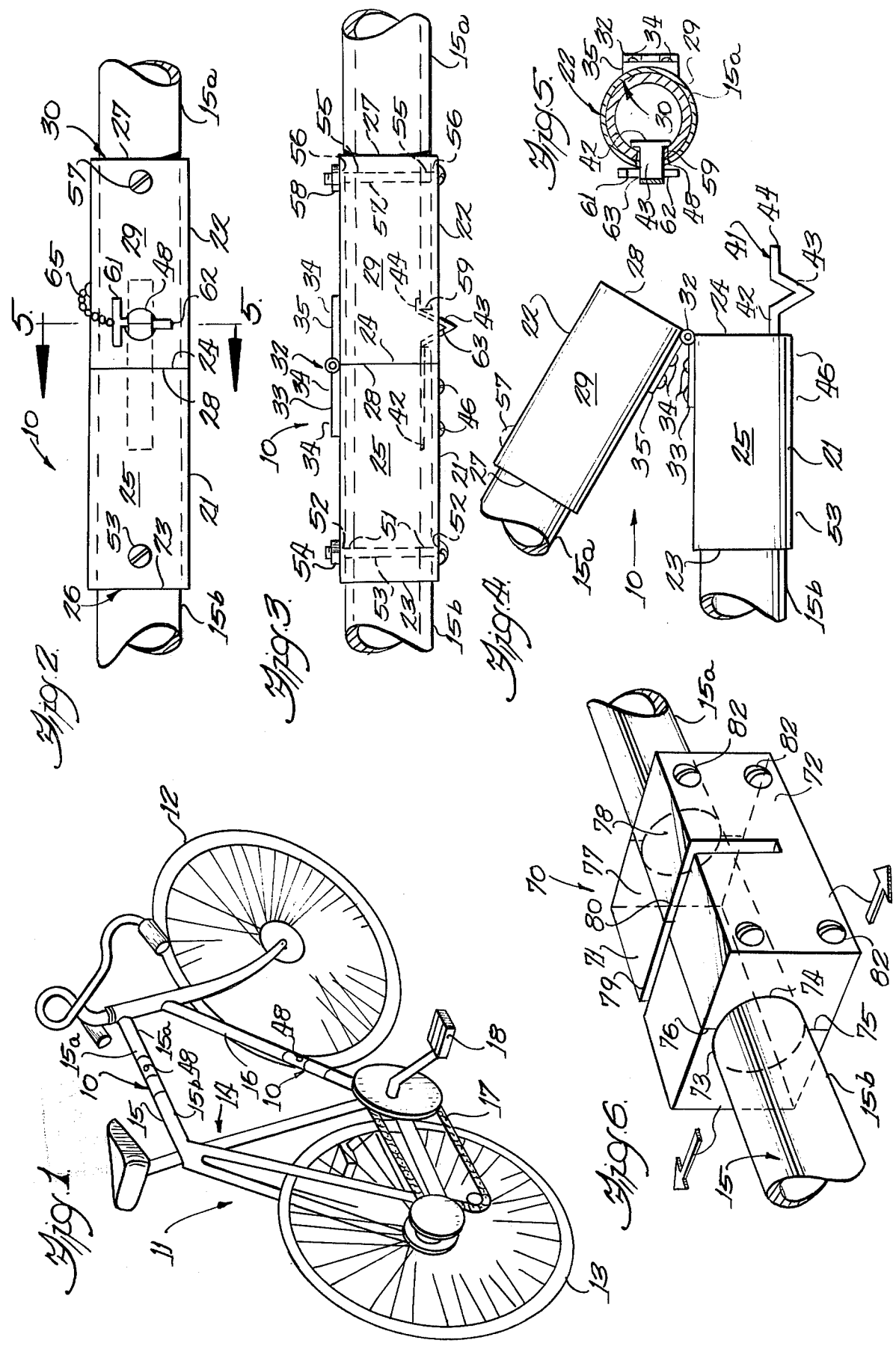

BICYCLE CONVERSION DEVICE

BACKGROUND OF THE INVENTION

1. Field of the Invention

This invention relates generally to bicycles and more particularly to a novel device for converting conventional type bicycles into compact folding type bicycles.

2. Description of the Prior Art

Conventional type two wheel bicycles consisting of two tandemly aligned wheels with a rigid frame interconnecting the same have been known for a great period of time, with little changes being made in the design thereof until more recent years as to providing bicycles of different sizes and components, each suited for a specific purpose, such as for general usage, racing, durability, and the like.

In view of the popularity of bicycles and considering that they require a great deal of space for storage or transportation, there was developed in the prior art bicycles adapted to be folded to provide compact storage thereof and ease of transportation therefor, such as when fitting the bicycle into an automobile or the like, a feat not possible with the conventional rigid frame bicycle which requires special racks or transportation devices for carrying the bicycle externally of the automobile.

Regretably, the folding bicycles of the prior art, as well as those presently being sold and marketed, do not provide the features and advantages of the rigid frame bicycles and thus serve more as curiousity items rather than being in competition with the rigid frame bicycles. Thus, individuals purchasing bicycles today lean toward the purchasing of the particularly desired rigid frame bicycle, and then labor with the same if it is required to transport or carry the same by automobile or the like for any distance, such as by inserting the bicycle in an automobile trunk with a portion of the same projecting outwardly therefrom and the trunk tied down to retain the bicycle in the trunk; laying the bike on its side in a station wagon with the associated difficulties in getting the bike into and out of the station wagon while on its side without damaging either the bicycle or the station wagon; and the like.

In view of the great number of conventional rigid frame bicycles, and the increased number of the same being sold every day in this country, it would be desirable to provide some means of transporting such bicycles in a minimum amount of space and with maximum convenience, other than having to totally disassemble the bicycle as by removal of the wheels from the frame and the like, which would then require reassembly at the point of utilization.

SUMMARY OF THE INVENTION

The present invention recognizes the problems associated with the conventional rigid frame bicycles and provides a novel solution for overcoming all of the foregoing deficiencies and disadvantages of presently available folding bicycles by providing a novel device for converting a conventional bicycle into a folding bicycle in a manner which, after the bicycle is once converted, permits the folding of the bicycle without requiring any special tools or expertise, and also permits the unfolding of the bicycle to the normal service position without any special tools or expertise.

It is a feature of the present invention to provide a device for converting a conventional bicycle into a folding bicycle, and which may be utilized on bicycles of all sizes, shapes and configurations, both of the well known men's version and women's version, and which when in the service position will provide a rigid frame structure while yet being readily foldable into a compact carrying and storage position with the wheels disposed in side-by-side relationship substantially parallel to each other.

Still a further feature of the present invention provides a device enabling a consumer to adapt his already owned conventional two wheel bicycle into a folding two wheel bicycle in a minimum of time and with a minimum of expense.

Yet still a further feature of the invention provides a device adapted to be mounted on the bicycle frame about the portions to be severed prior to inserting a hinge connection, such device assuring an accurate severing of such parts without any special skills or expertise required on the part of the individual performing the work.

The provision of a conversion device for bicycles, such as briefly outlined above, and possessing the stated advantages, constitutes the principal features of the present invention. The provision of a conversion device which is relatively simple in its construction and which therefore may be readily manufactured at a relatively low cost and by simple manufacturing methods; one which utilizes a minimum of moving components and which therefore is unlikely to get out of order; one which is rugged and durable and which therefore may be guaranteed by the manufacturer to withstand many years of intended usage; one which is aesthetically pleasing and refined in appearance so as to not detract from the appearance of the bicycle; one which may, in its entirety, be manufactured and installed as part of the original equipment of the bicycle permitting a manufacturer to sell a version of their conventional rigid bicycle in a folding format, or which may be readily attached to the bicycle later as an accessory item in a manner not affecting the operation or performance of the bicycle and not requiring any adjustment of bicycle components or the like, such as the chain, gears, or the like; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a conventional two wheel bicycle having a conversion device constructed in accordance with the present invention mounted thereon;

FIG. 2 is an enlarged fragmentary front elevational view of the conversion device of the present invention;

FIG. 3 is a fragmentary top plan view of the conversion device of FIG. 2;

FIG. 4 is a fragmentary top plan view of the conversion device mounted on a bicycle frame and shown in the partially folded position thereof;

FIG. 5 is a cross-sectional view taken along Line 5—5 of FIG. 2; and

FIG. 6 is a perspective view of a saw guide intended to be clamped about a frame member to be cut prior to the mounting of the conversion device and providing a guide for the saw to assure a cut normal to the axis of the tube being cut.

DESCRIPTION OF THE PREFERRED EMBODIMENT

Referring now to the drawings there is disclosed a preferred form of a conversion device constructed in accordance with the principles of the present invention and designated generally by the reference numeral 10, the device being illustrated in its intended mounting manner on a bicycle 11 having a front wheel 12, a back wheel 13, and a tubular frame 14 interconnecting the tandemly disposed wheels, such frame including a horizontal lengthwise member 15 and a diagonally lengthwise extending member 16. It is to be noted that the intended mounting of the conversion device 10 on any bicycle, such as bicycle 11, is to be in a manner dividing the frame 14 into a front section and a rear section with the division point being approximately midway of the length of the frame when the bicycle is in the operative service position. Further, it is to be noted that the conversion devices permit the folding of the bicycle 11 in a manner placing the wheels 12 and 13 in substantially side-by-side spaced parallel relationship, this operation of folding and unfolding the bicycle in no way affecting the mounting of the wheels or the drive of the back wheel, such as provided by chain and sprocket drive 17 in the conventional manner. In addition, for further compactness, it is to be understood that the individual owning the bicycle may wish to replace the conventional pedals 18 with pedals of the folding type which would fold from the in service horizontal position to the storage vertical position.

The conversion device 10 comprises a pair of axially aligned elongated hollow cylindrical collar members 21 and 22. Collar member 21 is provided with an outermost end 23, an innermost end 24, side walls 25, and an interior elongated cylindrical compartment 26 extending therethrough. Similarly, collar member 22 is provided with an outermost end 27, an innermost end 28, side walls 29, and a compartment 30 extending axially therethrough. The compartments 26 and 30 are of substantially the same interior dimensions and are adapted to receive therein a front section and a back section respectively of a frame member of the bicycle, such as member 15 or 16, such being designated for further descriptive purposes as referring to the member 15 having a front tubular section 15a and a rear tubular section 15b, such being severed from each other along a line extending substantially normal to the axis of the tube member, the manner of such severence being as will be later described. The collar members 21 and 22 are hingedly connected together by hinge 32 having a flange 33 connected to the side wall 25 by suitable means, such as by rivets 34 or the like, with an opposite flange 35 of the hinge member being connected to side wall 29 by suitable means, such as by rivet 34, collar members 21 and 22 being pivotal relative to each other about pivot pin 32 such that when in the axially aligned position innermost ends 28 and 24 are in abutting adjacent relationship.

Disposed in a longitudinal recess in compartment 25 and extending axially out of end 24 is a resilient locking member 41 having a shank portion 42, a V-shaped projection 43 and a terminal end portion 44. The locking member 41 is of an elongated rectangular configuration having the shank portion 42 mounted to the interior of side wall 25 diametrically opposed to flange 33 and secured thereto in any suitable manner, such as by rivets 46 or the like. The V-shaped projection 43 extends radially outwardly from the axis of the collar member 21 with the apex portion thereof adapted to be received in an aperture 48 provided in side wall 29 of collar member 22 in general alignment with the axis of the locking member such that the projection 43 extends through aperture 48 when the collar members are in the aligned position, such projection serving to retain the aligned position of the collar members.

In the mounting of the conversion device 10 to the severed tube 15, collar member 21 is axially aligned with the severed end of the tube 15b and then inserted thereover in a telescopic manner until innermost edge 24 is adjacent the severed edge of the tubing, at which position apertures 51 are drilled into tubing 15b in alignment with apertures 52 provided in side walls 25, with bolt 53 being axially inserted through the aligned openings 51 and 52 and secured in position by a suitable fastening means, such as a nut 54, thus retaining the collar member 21 firmly on the severed end portion of tubing 15b. Similarly, collar member 22 is axially aligned with the severed end of tubing section 15a, after which it is telescopically slipped thereover until innermost edge 28 is adjacent the severed end of the tube section, at which location openings 55 are drilled through the side walls of the tube section in alignment with openings 56 provided in the side walls 29 of the collar member, after which elongated bolt 57 is inserted through the aligned openings and secured in place by any suitable fastening means, such as by nut 58, thus firmly securing collar member 22 to the severed end portion of tubing section 15a. An opening 59 is then drilled in the side wall of tube section 15a in alignment with opening 48 to permit the apex portion of projection 43 to project through the aligned openings when the collar members are in the aligned positions.

To retain the aligned positions of the collar members 21 and 22 there is provided a T-shaped key member 61 having an elongated leg portion 62 of a size and cross-sectional area adapted to be received in the opening 63 defined between the interior apex portion of the projection 43 and the exterior surface of the side wall 29, the key being connected to the collar member 22 by a chain 65 or the like such that the key is always readily available for locking or unlocking the collar members in the aligned positions, it being required that the leg 62 either be inserted into or withdrawn from the opening 63 for locking or unlocking purposes.

To provide for the cutting of the tubular frame 14 of conventional bicycle 11, and to assure that the cut is normal to the longitudinal axis of the tube in preparation for the mounting of the device 10 thereon, there is provided a saw guide device 70 formed of a pair of symmetrical members 71 and 72 each having a semi-circular slot 73 and 74 extending longitudinally through their respective bottom surfaces 75 and 76 respectively such that when the bottom surfaces are placed in adjacent juxtaposition there is defined out of the semi-circular recesses a completely circular recess of a diameter approximately equal to the diameter of tube 15, the device 70 being placed about the tube 15 such that the center thereof is disposed exactly where the tube is to be severed into a front section 15a and a back section 15b. Members 71 and 72 are each provided in their respective top surfaces 77 and 78 with a transversely extending slot 79 and 80, such slots being in alignment when members 71 and 72 are in alignment with each other, the slots 79 and 80 extending through the respective members to a depth greater than the bottom edges of the respective slots 73 and 74 but not extending completely through the members to the opposite side thereof.

In operation, the members 71 and 72 are placed on diametrically opposed sides of the tube 15 and are clampingly secured thereto by means of screws or bolts extending transversely through member 72 and being threadedly received in axially aligned openings (not shown) in member 71, this placing the slots 79 and 80 in alignment with each other and disposed normal to the axis of the tube 15. The slots 79 and 80 are of a width to permit the insertion thereinto of a metal cutting blade, such as a hacksaw blade, with the interior side walls of the slots serving to accurately guide the cut of the hacksaw through the tubing in a plane normal to the tubing axis thus accurately severing the tubing into the front section 15a and rear section 15b. The device 70 is then removed from the tubing, the frame 14 separated into its respective front and rear sections, after which the conversion device 10 is secured to the severed tubing sections in the manner as aforedescribed thus hingedly connecting section 15a to section 15b, the axis of the pivot pins 32 being disposed in a vertical plane providing for the pivot movement of the tubing sections thereabout.

In this regard, it is to be noted that for diagonal tubing 16 that the device 10 which would interconnect the same would have the pivot 32 and flanges mounted thereon at an inclination to the axis of the tubing such that the pivot pins of the respective devices 10 on the bicycle 11 would be in axial alignment to permit the proper folding of the bicycle frame thereabout.

To fold the bicycle, key 61 is removed from opening 63, projection 43 is slightly manually depressed inwardly of the axis of collar member 22, after which section 15a is pivoted about pivot pin 32 in a manner to place such section substantially parallel to and next to section 15b in side-by-side relationship. To unfold the bicycle, section 15a is pivoted about pivot point 32 until it is in axial alignment with tubing section 15b, at which position projection 43 projects outwardly of openings 48 and 59 with the key 61 being inserted into the opening 63 to retain the aligned in service positions of the tubing sections 15a and 15b forming tube 15.

It is to be understood that the conversion device 10 and clamping cutting guide 70 would be provided in different sizes to accomodate different sized tubular members of various brands and manufactures of bicycles.

There is thus provided a novel device for converting conventional two wheel bicycles into folding bicycles of a compact nature, such being provided also with a cutting guide to assure the accurate severing of the bicycle frame preparatory to the mounting of the conversion thereon, the resultant folding bicyle operating in an in service position the same as a rigid frame bicycle and yet providing the advantages and conveniences of a folding bicycle.

It is to be understood that the form of this invention herewith shown and described is to be taken as a preferred example of the same, and that this invention is not to be limited to the exact arrangement of parts shown in the accompanying drawings or described in this specification as various changes in the details of construction as to size, shape, and arrangement of parts may be resorted to without departing from the spirit of the invention, the scope of the novel concepts thereof, or the scope of the sub-joined claims.

Having thus described the invention, what is claimed is:

1. A bicycle conversion kit device intended for converting a conventional rigid frame two wheel bicycle into a folding type bicycle, the conventional type bicycle having front and back wheels interconnected by a frame including at least one lnegthwise tubular extending member, the conversion device comprising the combination of:

a device adapted to be temporarily secured to the lengthwise extending member approximately midway of the length of the bicycle frame and providing a slot therein extending normal to the axis of the lengthwise member and adapted to receive therethrough a cutting blade intended for severing the frame member into a front sectional frame member and a rear sectional frame member with the division point approximately midway of the length of the bicycle framework;

a pair of elongated hollow cylindrical collar members hingedly connected together at their innermost surfaces in a manner providing pivotal movement about the hinge between an operative position orienting the collar members in axial alignment with each other and an inoperative position orienting the collar members in substantially parallel side-by-side relationship, the first one of the pair of collar members adapted to be telescopically received over the severed end portion of the lengthwise extending member, the second of the pair of collar members adapted to be telescopically received over the severed end portion of the other section of the lengthwise extending member;

the first and second collar members each having an interior elongated cylindrical compartment extending therethrough of a diameter approximately equal to the exterior diameter of the tubing for snugly receiving the same therein, each collar member adapted to be disposed on its respective tubular section with the innermost hinged edge thereof substantially adjacent the severed edge of the tubular section;

a bolt and nut associated with each collar member to be axially inserted through a pair of diametrically opposed apertures in each collar membere to secure each collar member to the associated lengthwise member, the hingedly connected collar members connecting the front sectional frame to the rear sectional frame pivotally at such division point to provide relative pivotal movement of the frame section between an operative service position where the front and back wheels are in aligned tandem relationship, and an inoperative folded position in which the two wheels of the bicycle are located substantially side-by-side in spaced and approximately parallel relationship; and a locking device disposed intermediate the innermost hinged edges of the collar members adapted to releasably secure the collar members in the axially aligned operative position to retain the hinged frame section in the operative aligned position preventing pivotal movement thereof, such key means adapted to also release the aligned position permitting the folding of the bicycle frame, the locking device comprising:

an elongated rectangularly shaped locking member having one end portion of a flat shaft portion secured to one of the collar members at a position diametrically opposed to the hinge connecting the collar members together, the shaft projecting axially out of the one collar member and provided with a radially outward extending V-shaped projection, an aperture provided in the second collar member to receive the V-shaped projection when the collar members are disposed in aligned operative relationship, the apex portion of the V-shaped projection extending through the opening provided in the side wall of the second collar member to define therewith a a passage intermediate the interior apex portion and the exterior side wall surface, the passage extending substantially normal to the axis of the aligned collar members, and key means consisting of a T-shaped key having an elongated shaft to be axially inserted through the passage to retain the V-shaped projection locked in position in the opening whereby the collar members are retained in the operative aligned position, withdrawal of the key means from the passage permitting the projection to be manually depressed interiorly of the second collar member with the collar member then being free for pivoting to its inoperative position.

2. The bicycle conversion device as set forth in claim 1 wherein the device for guiding the cutting blade in the severing of the bicycle frame preparatory to the attachment of the hinge means thereto comprises a pair of symmetrical rectangularly shaped elongated members adapted to be detachably secured together with their base surfaces in adjacent juxtaposition, each of the base surfaces provided with a semi-circular slot extending longitudinally therethrough, each of the slots being in opposed confronting relationship so as to define therebetween a circular elongated opening extending through the device of a diameter approximately equal to the diameter of a length of tubing to be inserted therethrough for severing purposes, and a slot disposed centrally of each member extending transversely therethrough and extending to a depth greater than the diameter of the semi-circular recesses to form a guide for the cutting blade to sever the tubing along a plane normal to the axis of the tubing, and the pair of members adapted to grip the tubing therebetween in a firm manner with the respective slots thereof being automatically in alignment upon the members being detachably secured together firmly about the tubing.

3. The bicycle conversion device as set forth in claim 2 wherein the members of the blade guiding device are detachably secured together by a plurality of bolts extending freely through one of the members and threadedly received in aligned openings provided in the opposite member whereby after the members are placed about a tubing the bolt serves to clamp the device firmly to the tubing.

* * * * *